United States Patent Office 3,273,277
Patented Sept. 20, 1966

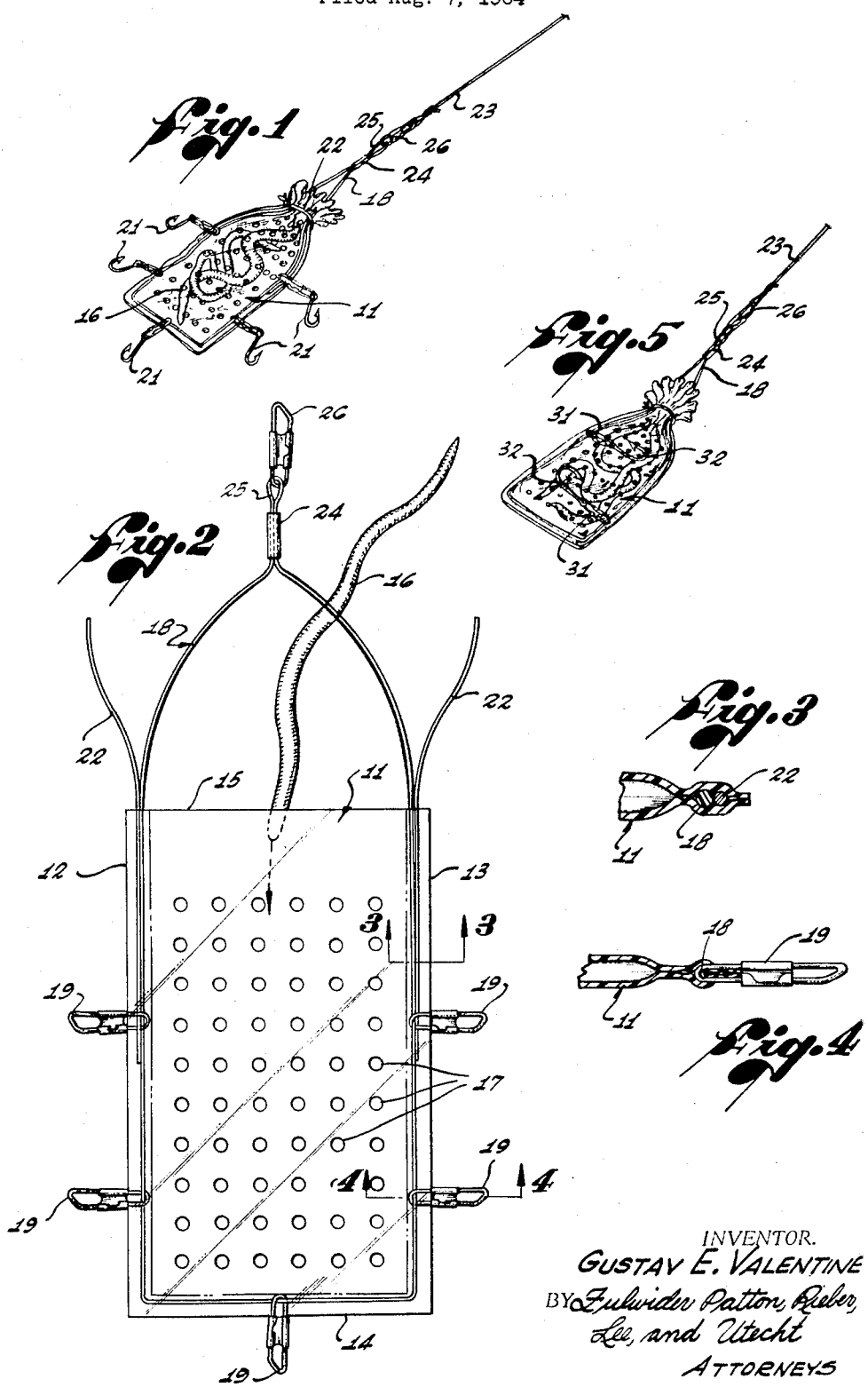

3,273,277
FISH LURE
Gustav E. Valentine, 2162 N. Holliston Ave.,
Altadena, Calif.
Filed Aug. 7, 1964, Ser. No. 388,141
8 Claims. (Cl. 43—41)

The present invention relates to a fish lure including a transparent, pervious bag for bait associated with a fish hook.

Placing fish bait directly on a hook, as by threading the hok therein, and exposing the bait directly to the water has certain disadvantages. It is repugnant to some persons to thread a fish hook into live bait, such as worms, grubs, insects and minnows, particularly in the case of small worms whose movements make them difficult to move onto the hook. Furthermore, the bait is subject to falling off the hook, not only with the baits listed, but also where cheese and like porducts having insufficient inherent strength are placed on the hook. In addition, such bait is subject to being nibbled off the hook by small fish which it is not desired to catch. Also, live bait is quickly killed by the insertion of a hook herein.

According to the present invention, fish bait is placed in a small bag of perforated, transparent plastic whereby the bait may not only be seen through the transparent bag, but water flows through the bag perforations to place the scent, or whatever else attracts the fish to the bait, in the water to bring it to the fish's attention. A strong leader is placed around the bag lengthwise thereof and one or a plurality of hooks are attached to this leader so that any fish caught on the hook has its strain or pull transmitted through the leader to the fish line without going through the relatively frail and weak bait holding bag. Additional means are provided for closing the top of the bag to prevent loss of the bait therefrom.

It is therefore an object of the present invention to provide an improved fish lure using a food type bait disposed in a bag or like enclosure associated with a fish hook.

Another object of this invention is the provision of an improved fish lure having a transparent, perforated bait holding bag associated with a fish hook, in which a leader encloses the bag for the attachment of a hook thereto for supporting the hook from a fish line without straining the material of the bait bag.

A further object of this invention is an improved fish lure in acocrdance with either of the preceding objects in which the hook may be singular or plural and supported at the outside of the bait bag or disposed inside of the bag in a relatively inconspicuous position.

A still further object of this invention is the provision of an improved fish lure including a transparent bait bag pervious to the flow of water therethrough and securely mounted on a fishing leader, with means on the leader for attachment of fish hooks thereto independently of any support from the material of the bait bag, and including attachment ties secured to the bag, both the leader and the ties being adhered to the bait bag.

These and other objects and features of the invention will be apparent to those skilled in the art from the following specification and the appended drawing, in which:

FIGURE 1 is a perspective view of a fish lure according to the present invention mounted on a fish line with bait therein and having fish hooks exterior of the bait bag;

FIGURE 2 is an enlarged elevational view of a fish lure according to the present invention;

FIGURE 3 is a detail sectional view on the line 3—3 of FIGURE 2;

FIGURE 4 is a detail sectional view on the line 4—4 of FIGURE 2; and

FIGURE 5 is a view similar to FIGURE 1, but showing a modification with the fish hooks disposed within the bait bag.

Referring now to the embodiment of the invention illustrated in FIGURES 1 through 4, the bait bag 11 may be of ordinary end envelope construction, closed at its side edges 12 and 13 and bottom edge 14, and open at its top edge 15 for the receipt of bait 16, such as the worms shown in FIGURES 1 and 2, to be enclosed within the bag 11. This bag may be formed of any material, desirably a transparent plastic such as cellophane or the like, and has its walls perforated to provide a multiplicity of openings 17 therein for the passage of water therethrough to contact the bait 16 within the bag.

A continuous leader 18 follows the outside closed edges of the bag 11, as illustrated in FIGURES 1 and 2, to substantially enclose the bag 11 in its loop. The leader 18 may be of any desired material, but for both appearance and strength, a nylon-coated, stranded steel wire may be used effectively. Attachment clips 19 are secured on the leader 18 and in the embodiment of FIGURES 1 through 4 are disposed at the outside of bag 11 at the sides and bottom of the bag for the attachment of fish hooks 21, as shown in FIGURE 1. It is obvious that any number of clips 19 and hooks 21 may be associated with the bait bag 11 and leader 18.

Tie elements 22 are attached to the top of the bag, as shown more particularly in FIGURES 2 and 3. These ties may be of plastic material or of brass or copper wire for more ready wrapping and tying about the closed top of the bag 11, as shown in FIGURES 1 and 5. The tie elements 22 and the leader 18 are securely adhered to the opposite side edges of the bag 11, as by heat seailng or other methods of attachment, and may be associated, as shown in the detail sectional view of FIGURE 3. The leader 18 is thus attached to the opposite side edges 12 and 13 throughout their entire length and is also desirably sealed to the bottom edge 14 in the same manner.

With the above arrangement, it is seen that the clips 19 and hooks 21 are carried on the fish line 23 by direct support through the leader 18 without stressing the bait bag 11. The ends of the leader 18 are joined together above the bag 11 by a clamp 24 to form a loop or eye 25 in which is mounted an attachment clip 26 to which the line 23 is connected.

In using the fish lure according to the present invention, the bait 16 which may be of any material to which fish are attracted, such as minnows, grubs, insects, worms, cheese and like food baits, is dropped into the bag 11, as indicated by the dotted arrow applied to the worm in FIGURE 2. After the bait is disposed in the bag 11, the tie elements 22 are wrapped around the top of the bag to draw it tightly together and secure it against loss of the bait, as shown in FIGURES 1 and 5. The opposite legs of the leader 18 are thereby brought into juxtaposition as also shown in these figures.

In the embodiment of the invention shown in FIGURES 1 through 4, the attachment clips 19 and the hooks 21 mounted thereon are disposed at the outside of the bag 11 which contains only the bait 16 in contact with the water through the openings 17 so that the scent or other attracting essence of the bait will be carried out into the water in which the fish lure is used. A fish attempting to reach the bait 16 will be caught on the hooks 21 and its pull will be carried directly from the hook and attachment clip through leader 18 to the line 23.

With this arrangement it will be seen that the undesirable task of threading a hook into bait is entirely avoided, while the bait is exposed to the view of the fish and the scent or other attracting essence of the bait is placed in the water about the lure through the openings 17 in the bait bag. Since the bait 16 is within the bag 11, it not only cannot be lost, but also is not injured by the hooks and may be maintained alive for a considerable period of time and be more attractive to the fish it is desired to lure. With all of the above, the bait holding bag is readily and securely closed upon the fishing leader, and the fish hooks and any fish caught thereon are secured through the leader to the fish line without reliance for support from the material of the bait bag, upon which no substantial strain is placed.

In the modification of FIGURE 5, the elements are substantially the same as heretofore described, except that the clips 19 are replaced by attachment clips 31 which extend into the bag 11 and there support hooks 32 within the bag where they are less conspicuous to the fish being lured. While only a pair of attachment clips 31 is shown, it is obvious that their number and disposal is a matter of selection. The hooks 32 may remain entirely within the bag 11, or the ends of the hooks may be threaded outwardly of the bag through one or more of the openings 17 while the shank of the hook and the attachment clips 31 remain within the bag 11.

Likewise the hooks 21 in FIGURE 1 may have their ends threaded through a pair of openings 17 to attach them to the bag 11, whereby they are somewhat less conspicuous and do not dangle remotely from the bait bag.

It is an obvious extension of the disclosures of FIGURES 1 and 5 that the attachment clips 19 or 31 may be universally mounted so that they may be extended through appropriate openings through the bag 11 to the inside or outside thereof at the option of the user, and so that hooks may be mounted both inside and outside of the bag at the same time. Likewise, certain of the clips 19 could be combined with clips 31 for the same purpose.

While certain preferred embodiments of the invention have been specifically illustrated and described, it will be understood that the invention is not limited thereto as many variations will be apparent to those skilled in the art and the invention is to be given its broadest interpretation within the terms of the following claims.

I claim:

1. A fishing lure comprising: a transparent, water pervious bait bag having an open top for the reception of bait materials to be placed in the bag; a leader secured to said bag and extending around the side and bottom edges thereof, said leader being completely embedded in the side edges of said bag; means on said leader for attachment of a fish line; and means on at least one embedded leg of said leader for the securement of a fish hook to the leader whereby the strain of a fish caught on the hook is applied to the line through the leader without substantial strain on the bait bag.

2. The fishing lure defined in claim 1, in which said bag is formed of a transparent plastic sheet material made pervious to water by perforations in the walls thereof smaller than the bait to be disposed within the bag.

3. A fishing lure comprising: a transparent, water pervious bait bag having an open top for the reception of bait materials to be placed in the bag; a leader secured to said bag and extending around the side and bottom edges thereof; means on said leader for attachment of a fish line; means on at least one leg of said leader for the securement of a fish hook to the leader whereby the strain of a fish caught on the hook is applied to the line through the leader independently of support from the bait bag; and tie elements secured to said bag adjacent the open top thereof to tie the top together to securely enclose the bait in the bag, thereby bringing the side legs of the leader into juxtaposition.

4. A fishing lure comprising: a transparent, water pervious bait bag having an open top for the reception of bait materials to be placed in the bag; a leader secured to said bag and extending around the side and bottom edges thereof; means on said leader for attachment of a fish line; means on at least one leg of said leader for the securement of a fish hook to the leader whereby the strain of a fish caught on the hook is applied to the line through the leader independently of support from the bait bag; and tie elements secured to said bag adjacent the open top thereof to tie the top together to securely enclose the bait in the bag, thereby bringing the side legs of the leader into juxtaposition, said tie elements being in the form of short wires secured to the opposite side edges of the bag and twistable about the bag top to close the same.

5. The fishing lure defined in claim 4 in which said tie wires are heat sealed to the bag adjacent the top side edges thereof and extend above the open top of the bag.

6. The fishing lure defined in claim 1 wherein said means for the securement of a fish hook includes an attachment clip for the hook extending inwardly of the bait bag for the disposal of the fish hook at least partially within the bag in an inconspicuous position.

7. The fishing lure defined in claim 1 wherein said means for the securement of a fish hook includes hook attachment clips on the leader at the opposite sides and bottom of the bag to locate fish hooks thereat supported from the leader without strain on the bait bag.

8. A fishing lure comprising: a transparent, water pervious bait bag having an open top for the reception of bait materials to be placed in the bag; a leader secured to said bag and extending around the side and bottom edges thereof; means on said leader for attachment of a fish line; and means on at least one leg of said leader for the securement of a fish hook to the leader whereby the strain of a fish caught on the hook is applied to the line through the leader without substantial strain on the bait bag, said leader being heat sealed around said bag adjacent the side and bottom edges thereof.

References Cited by the Examiner

UNITED STATES PATENTS

| | | | |
|---|---|---|---|
| 1,870,273 | 8/1932 | Willinger | 43—41 |
| 2,780,021 | 2/1957 | Fagg | 42—41 |

ABRAHAM G. STONE, *Primary Examiner.*

R. L. HOLLISTER, *Assistant Examiner.*